US009002158B2

(12) United States Patent
Drost et al.

(10) Patent No.: US 9,002,158 B2
(45) Date of Patent: Apr. 7, 2015

(54) OPTICAL CONNECTOR WITH REDUCED MECHANICAL-ALIGNMENT SENSITIVITY

(71) Applicant: Oracle International Corporation, Redwood City, CA (US)

(72) Inventors: Robert J. Drost, Los Altos, CA (US); John E. Cunningham, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/936,430

(22) Filed: Jul. 8, 2013

(65) Prior Publication Data

US 2013/0308903 A1 Nov. 21, 2013

Related U.S. Application Data

(63) Continuation of application No. 12/495,228, filed on Jun. 30, 2009, now Pat. No. 8,554,025.

(51) Int. Cl.
| | |
|---|---|
| *G02B 6/12* | (2006.01) |
| *G02B 6/36* | (2006.01) |
| *G02B 6/42* | (2006.01) |
| *G02B 6/30* | (2006.01) |
| *G02B 6/34* | (2006.01) |
| *G02B 6/43* | (2006.01) |

(52) U.S. Cl.
CPC .............. *G02B 6/4204* (2013.01); *G02B 6/30* (2013.01); *G02B 6/34* (2013.01); *G02B 6/43* (2013.01); *G02B 6/4215* (2013.01); *G02B 6/4298* (2013.01)

(58) Field of Classification Search
USPC .......................................... 385/14, 31, 37, 52
See application file for complete search history.

(56) References Cited

U.S. PATENT DOCUMENTS

| | | | | |
|---|---|---|---|---|
| 6,477,285 | B1 * | 11/2002 | Shanley | .......................... 385/14 |
| 7,065,272 | B2 | 6/2006 | Taillaert | |
| 7,619,312 | B2 | 11/2009 | Krishnamoorthy | |
| 2008/0085076 | A1 * | 4/2008 | Lee et al. | ......................... 385/14 |

OTHER PUBLICATIONS

Ammer, T. et al., "Novel small form factor optical ribbon fiber connector for singlemode applications", Huber+Suhner AG, CH-9100 Herisau, Switzerland.

Masanovic, G.Z., et al., "Coupling to nanophotonic waveguides using a dual grating-assisted directional coupler", IEE Proceedings online No. 20055006, May 14, 2004, vol. 152, No. 1, Feb. 2005, pp. 41-48.

(Continued)

*Primary Examiner* — Eric Wong
(74) *Attorney, Agent, or Firm* — Park, Vaughan, Fleming & Dowler LLP; Steven E. Stupp (57) ABSTRACT

An optical connector is described. This optical connector spatially segregates optical coupling between an optical fiber and an optical component, which relaxes the associated mechanical-alignment requirements. In particular, the optical connector includes an optical spreader component disposed on a substrate. This optical spreader component is optically coupled to the optical fiber at a first coupling region, and is configured to optically couple to the optical component at a second coupling region that is at a different location on the substrate than the first coupling region. Moreover, the first coupling region and the second coupling region are optically coupled by an optical waveguide.

20 Claims, 7 Drawing Sheets

(56) References Cited

OTHER PUBLICATIONS

Csutak, S.M. et al., "CMOS-Compatible Planar Silicon Waveguide-Grating-Coupler Photodetectors Fabricated on Silicon-on-Insulator (SOI) Substrates", IEEE Journal of Quantum Electronics, vol. 38, No. 5, May 2002.

Huang, Andrew et al., "A 10Gb/s Photonic Modulator and WDM MUX/DEMUX Integrated with Electronics in 0.13um SOI CMOS", ISSCC 2006/ Session 13/ Optical Communication/ 13.7, 2006 IEEE International Solid-State Circuits Conference.

Ang, T.W. et al., "Grating couplers using silicon-on-insulator", Proc. SPIE, vol. 3620, pp. 7986, 1999.

Optical Fiber Connector, en.wikipedia.org, LC connector entry, downloaded Jul. 7, 2009.

Krishnamoorthy, Ashok et al., Patent Application Entitled: "Proximity Active Connector and Cable", U.S. Appl. No. 11/165,996, filed Jun. 24, 2005.

* cited by examiner

OPTICAL CONNECTOR WITH REDUCED MECHANICAL-ALIGNMENT SENSITIVITY

RELATED APPLICATION

This application is a continuation application of, and hereby claims priority under 35 U.S.C. §120 to, pending U.S. patent application Ser. No. 12/495,228, entitled "Optical Connector with Reduced Mechanical-Alignment Sensitivity," by inventors Robert J. Drost, John E. Cunningham and Ashok V. Krishnamoorthy, filed on 30 Jun. 2009.

BACKGROUND

1. Field

The present disclosure relates to an optical connector for coupling together optical components. More specifically, the present disclosure relates to an optical connector for coupling together optical components with reduced mechanical-alignment sensitivity.

2. Related Art

While optical communication potentially offers higher performance than electrical communication, in many applications this advantage is outweighed by higher costs. In particular, many optical systems have higher manufacturing, installation, and maintenance costs. For example, optical connectors, which are used to optically couple systems components, are often a major contributor to the overall cost of optical systems.

One reason for this is the need to establish and maintain tight mechanical alignment between optical connectors and associated optical components. Without such tight mechanical alignment, the optical connectors will reflect optical signals (instead of communicating them), thereby reducing the efficiency of the optical connector and, thus, the performance of the optical systems. For example, carrier wavelengths in many optical systems are on the order of 1 µm, and optical reflections can occur in optical connectors even if there is mechanical misalignment of a quarter of a carrier wavelength. Thus, the mechanical alignment requirements in optical connectors can be less than 1 µm.

Some existing optical connectors address this design requirement using precision molded and polished components, as well as with mechanical strain-relief connectors. While these techniques facilitate precise mechanical alignment, the resulting optical connector is often large and expensive.

Other existing optical connectors amortize the size and cost of an optical connector across a parallel set of optical fibers, which are often referred to as an 'optical ribbon cable.' For example, an optical ribbon cable may include twelve parallel optical fibers in a one-by-twelve arrangement. However, it is often difficult to further increase the number of optical fibers in an optical ribbon cable (for example, to multiple rows or more than twelve parallel optical fibers) while maintaining the required mechanical alignment.

Hence, what is needed is an optical connector without the above-described problems.

SUMMARY

One embodiment of the present disclosure provides an optical connector that includes an optical fiber and an optical spreader component, which is disposed on a substrate. This optical spreader component spatially segregates optical coupling between the optical fiber and an optical component. Moreover, the optical spreader component includes: a first coupling region that is optically coupled to the optical fiber; an optical waveguide that is optically coupled to the first coupling region; and a second coupling region that is optically coupled to the optical waveguide, and which is configured to optically couple to the optical component. Note that a location of the second coupling region is different than a location of the first coupling region.

In some embodiments, the optical component includes: an optical source, an optical modulator, an optical detector, an optical fiber, and/or another instance of the optical connector, which includes another optical spreader component that is disposed on another substrate. For example, the second coupling region in the optical connector may be optically coupled to a third coupling region in the other instance of the optical connector via optical proximity communication (such as via a spherical optical ball). However, in some embodiments the optical component is also disposed on the same substrate as the optical connector.

Because the coupling between the optical fiber and the optical spreader component may be sensitive to mechanical alignment, the mechanical coupling between the optical fiber and the optical spreader component may be rigid. However, the optical coupling between the optical spreader component and the optical component may be less sensitive to mechanical alignment. Consequently, the optical spreader component may be configured to re-matably mechanically and/or optically couple to the optical component. Furthermore, a mechanical alignment tolerance of optical coupling between the optical connector and the optical component may be larger than a carrier wavelength of an optical signal conveyed via the optical fiber.

In some embodiments, the first coupling region includes an optical coupling component (such as a diffraction grating) that optically couples an optical signal from the optical fiber to the optical waveguide.

Note that the optical spreader component may be a passive device.

Furthermore, the optical spreader component may include routing from a first group of coupling regions, which includes the first coupling region, to second group of coupling regions, which includes the second coupling region.

In some embodiments, the optical spreader component includes components and functionality that facilitate processing and/or communication of optical signals, including: a wavelength-selective multiplexer, a wavelength-selective de-multiplexer, optical switching of optical signals, an optical monitor, active optical amplitude equalization, and/or optical gain.

Another embodiment provides a system that includes the optical connector.

Another embodiment provides a method for spatially segregating optical coupling between the optical fiber and the optical component using the optical connector. During this method, the first coupling region in the optical spreader component in the optical connector receives the optical signal from the optical fiber. Then, the first coupling region optically couples the optical signal to the second coupling region in the optical spreader component via the optical waveguide in the optical spreader component. Next, the second coupling region optically couples the optical signal to the optical component.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of an optical connector, a system (such as a computer system) that includes the optical connector, and a method for spatially segregating optical coupling are described. This optical connector spatially segregates optical coupling between an optical fiber and an optical component, which relaxes the associated mechanical-alignment requirements. In particular, the optical connector includes an optical spreader component disposed on a substrate. This optical spreader component is optically coupled to the optical fiber at a first coupling region, and is configured to optically couple to the optical component at a second coupling region that is at a different location on the substrate than the first coupling region. Moreover, the first coupling region and the second coupling region are optically coupled by an optical waveguide.

By spatially segregating the optical coupling between the optical fiber and the optical component, and by reducing the mechanical-alignment requirements, this optical connector can improve optical-system cost, performance and reliability. For example, the mechanical alignment requirements can be increased to on the order of 10 µm for an optical signal with a carrier wavelength of 1 µm, which allows the manufacturing and assembly cost of the optical connector to be significantly reduced relative to existing optical connectors.

We now describe embodiments of an optical connector. As noted previously, it can be very difficult to achieve and maintain tight mechanical alignment, especially in optical connectors that directly couple one or more optical fibers to one or more optical components, such as planar optical devices and/or other optical fibers. This is because small gaps or other mechanical misalignments between an optical fiber and its coupling target can significantly attenuate optical coupling by increasing optical reflections. In the discussion that follows, the sensitivity of an optical connector to mechanical misalignment is significantly reduced (e.g. by an order of magnitude or more).

Figure 1A:
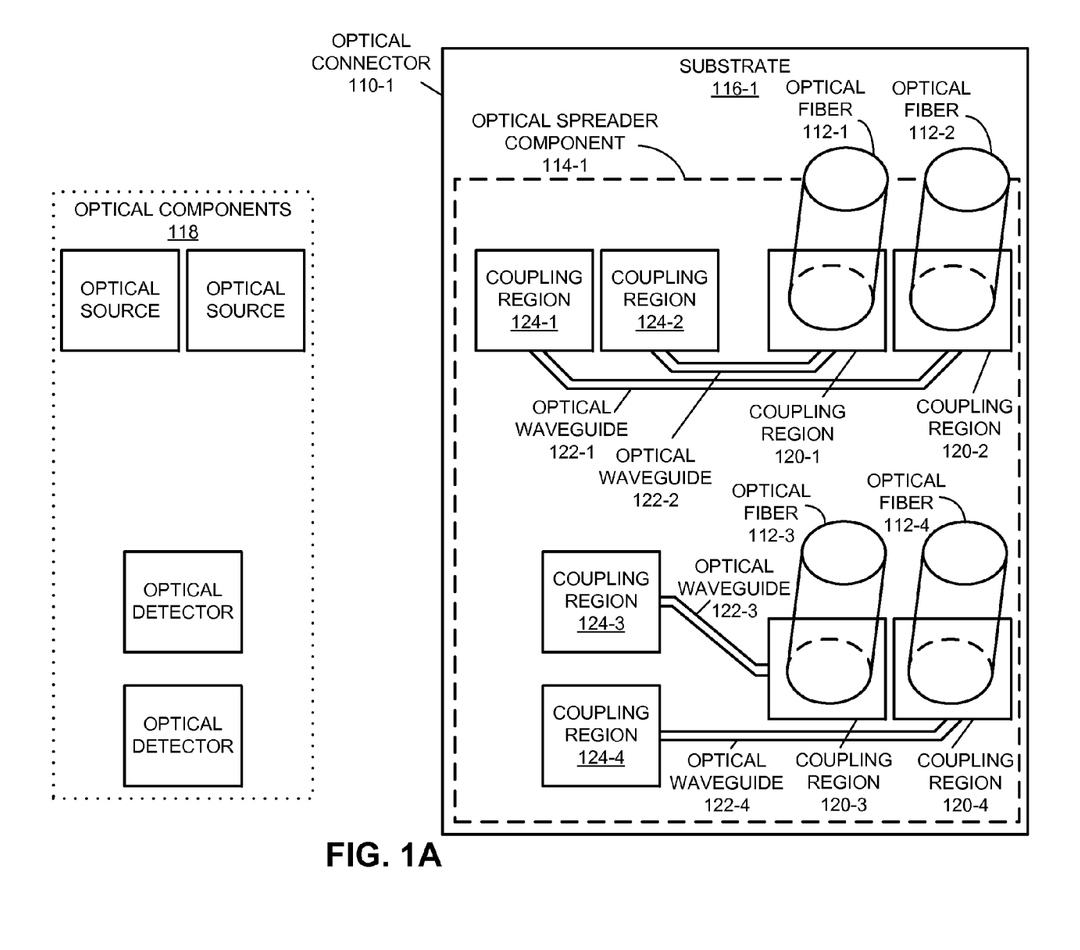
FIG. 1A is a block diagram illustrating an optical connector and optical components in accordance with an embodiment of the present disclosure.

FIG. 1A presents a block diagram illustrating an optical connector 110-1 and optical components 118. Optical connector 110-1 includes optical fibers 112 and an optical spreader component 114-1, which is disposed on a substrate 116-1. For example, substrate 116-1 may be silicon or silicon-on-insulator (SOI). Optical spreader component 114-1 may spatially segregate optical coupling between optical fibers 112 and optical components 118. Moreover, optical spreader component 114-1 may include: one or more coupling regions 120 that are optically coupled to optical fibers 112 (and which are arranged in a two-by-two array); optical waveguides 122 that are optically coupled to coupling regions 120; and coupling regions 124 that are optically coupled to optical waveguides 122, and which are configured to optically couple to optical components 118. Note that coupling regions 120 and 124 are at different locations on substrate 116-1 (i.e., they are spatially segregated).

Figure 1B:
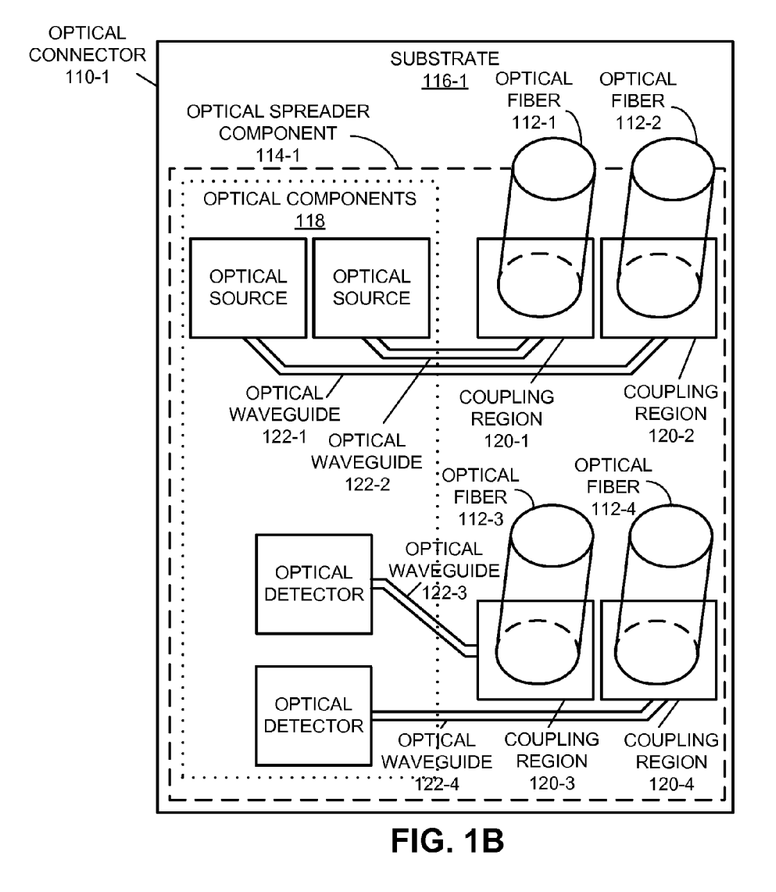
FIG. 1B is a block diagram illustrating overlap of the optical connector and the optical components of FIG. 1A in accordance with an embodiment of the present disclosure.

Optical connector 110-1 may be optically coupled to optical components 118 at coupling regions 124. FIG. 1B presents a block diagram illustrating overlap of optical connector 110-1 and optical components 118 when they are optically coupled. In some embodiments, some or all of optical components 118 are disposed on substrate 116-1 or another substrate. Thus, optical connector 110-1 may facilitate intra- or inter-chip optical communication. Furthermore, optical and/or mechanical coupling between optical components 118 and optical connector 110-1 can be fixed (such as when optical components 118 are disposed on substrate 116-1). However, as described further below, in other embodiments optical connector 110-1 facilitates re-matable optical and/or mechanical coupling to optical components 118.

Optical components 118 may include a wide variety of devices, including: an optical source (such as a laser), an optical detector, an optical modulator (such as a ring resonator), an optical fiber, and/or an optical component that couples an optical signal into any of these devices. In embodiments where optical components 118 are disposed on a substrate (such as substrate 116-1 or the other substrate), they may be included in a planar array of optical devices on: a package, chip, and/or board. For example, the planar array of devices may be included on: a silicon photonics chip, a silicon optical bench, and/or an optical wafer board.

In some embodiments, one or more of coupling regions 120 includes an optical coupling component (such as a diffraction grating or a mirror) that optically couples optical signals from optical fibers 112 to optical waveguides 122. For example, if substrate 116-1 is silicon, a mirror may be fabricated along the 54° cleavage plane. Furthermore, a diffraction grating may include: square teeth or reflectors, trapezoidal teeth or reflectors, and/or curved grating arrangements.

Similarly, one or more of coupling regions 124 may include an optical coupling component. These optical coupling components may be used to optically couple to optical components 118, for example, using optical proximity communication. In some embodiments, such as when these optical components are disposed on the other substrate, optical coupling between optical connector 110-1 and optical components 118 is mediated via pits and spherical optical balls.

In additional to relaxing mechanical alignment tolerances, optical connector 110-1 may reduce geometric constraints in a variety of components. For example, widths of optical waveguides 122 may vary in optical spreader component 114-1 and/or may be different than the widths of other optical waveguides or than optical fibers 112. Thus, optical waveguides 122 may be wide (so-called fat waveguides) and/or may be tapered, which allows wide optical fibers 112 to be optically coupled to smaller devices, such as one or more sub-micron components in optical components 118.

Furthermore, note that optical spreader component 114-1 permits reorganization of the spacing and positions of optical components 118 and optical fibers 112. While a two-by-two array is used as an illustration, optical connector 110-1 supports a wide variety of optical-fiber array configurations and sizes. Furthermore, optical spreader component 114-1 may facilitate optical coupling to optical fibers 112 and optical components 118 on the same side of substrate 116-1 or on opposite sides of substrate 116-1. If optical fibers 112 and optical components 118 are on opposite sides of substrate 116-1, light may need to pass through substrate 116-1. This may be accomplished using a transparent substrate and/or by etching holes through substrate 116-1, and inserting optical fibers in the holes (or fabricating optical waveguides in the holes).

In some embodiments, optical spreader component 114-1 is a passive device (e.g., it does not include an electronic device). For example, optical waveguides 122 may provide routing from coupling regions 120 to coupling regions 124. However, in other embodiments optical spreader component 114-1 includes active devices (e.g., it includes an electronic device).

In some embodiments, optical spreader component 114-1 includes components and/or functionality that facilitate processing and/or communication of optical signals, including: a wavelength-selective multiplexer, a wavelength-selective de-multiplexer, an optical switch, an optical filter, an optical add/drop, an optical monitor (which taps and detects a portion of an optical signal), active optical amplitude equalization (such as variable optical attenuation), and/or optical gain (such as all-optical, in-line gain).

Figure 2A:
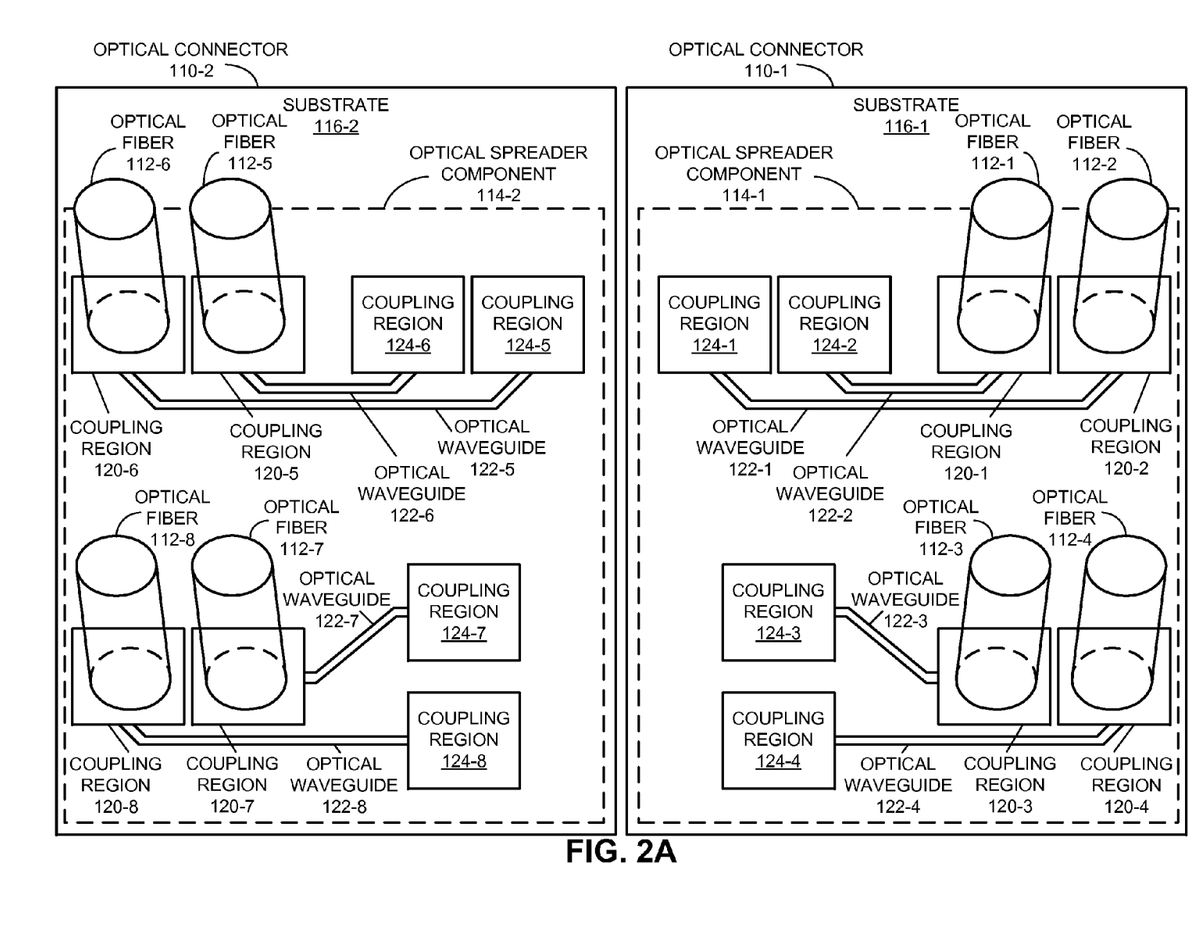
FIG. 2A is a block diagram illustrating two instances of the optical connector of FIG. 1A in accordance with an embodiment of the present disclosure.
Figure 2B:
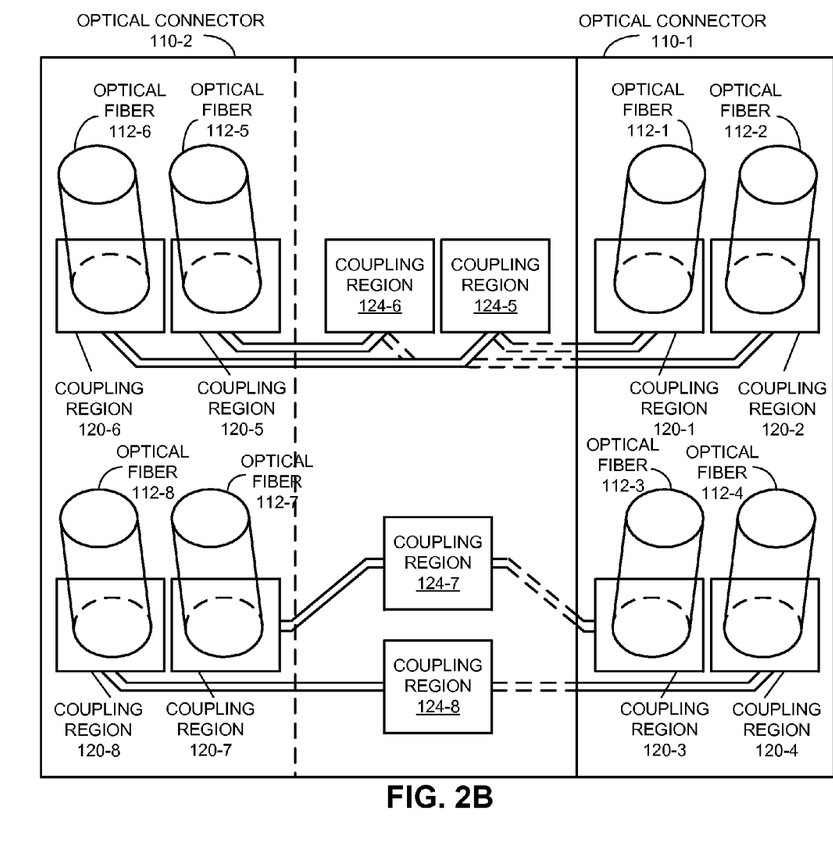
FIG. 2B is a block diagram illustrating overlap of the two instances of the optical connector in FIG. 2A in accordance with an embodiment of the present disclosure.
Figure 2C:
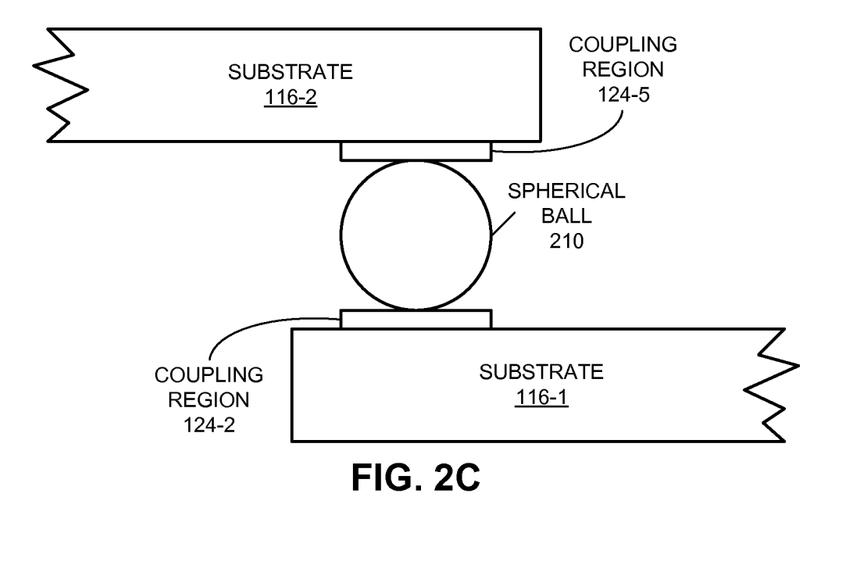
FIG. 2C is a block diagram illustrating overlap of the two instances of the optical connector in FIG. 2A in accordance with an embodiment of the present disclosure.

In some embodiments, optical components 118 include another instance of the optical connector (disposed on another substrate), which facilitates optical coupling of sets of optical fibers (such as optical fibers 112). This is shown in FIG. 2A, which presents a block diagram illustrating optical connectors 110-1 and 110-2. Coupling regions 124-1 through 124-4 on optical connector 110-1 may optically couple to coupling regions 124-5 through 124-8 on optical connector 110-2. This is shown in FIG. 2B, which presents a block diagram illustrating overlap of optical connectors 110-1 and 110-2. As noted previously, in some embodiments this optical coupling is mediated using spherical optical balls, such as spherical ball 210 shown in FIG. 2C.

Referring back to FIG. 1A, because the coupling between optical fibers 112 and optical spreader component 114-1 may be sensitive to mechanical alignment, the mechanical and/or optical coupling between optical fibers 112 and optical spreader component 114-1 may be rigid. For example, these components may be positioned relative to each other in a clean environment under controlled conditions. (However, in other embodiments, the mechanical and/or optical coupling between optical fibers 112 and optical spreader component 114-1 may be re-matable.)

Optical coupling between optical spreader component 114-1 and optical components 118 may be less sensitive to mechanical alignment. Consequently, optical spreader component 114-1 may be configured to re-matably mechanically and/or optically couple to optical components 118. This may facilitate reconfiguring of a system in the field. Furthermore, a mechanical alignment tolerance of optical coupling between optical connector 110-1 and optical components 118 may be larger than a carrier wavelength of one or more optical signals conveyed via optical fibers 112. Note that re-matable mechanical alignment may utilize spherical balls and pits, and/or another alignment technique known to one of skill in the art.

Re-matable coupling of optical connectors 110 (such as those shown in FIGS. 2A-2B) may offer lower cost and improved reliability in proximity communication. For example, it may allow active proximity-communication circuitry, optical-to-electrical and electrical-to-optical conversion elements, as well as the related power delivery and heat-removal complexity, to be reduced or eliminated by using optical spreader component 114-1.

Figure 3:
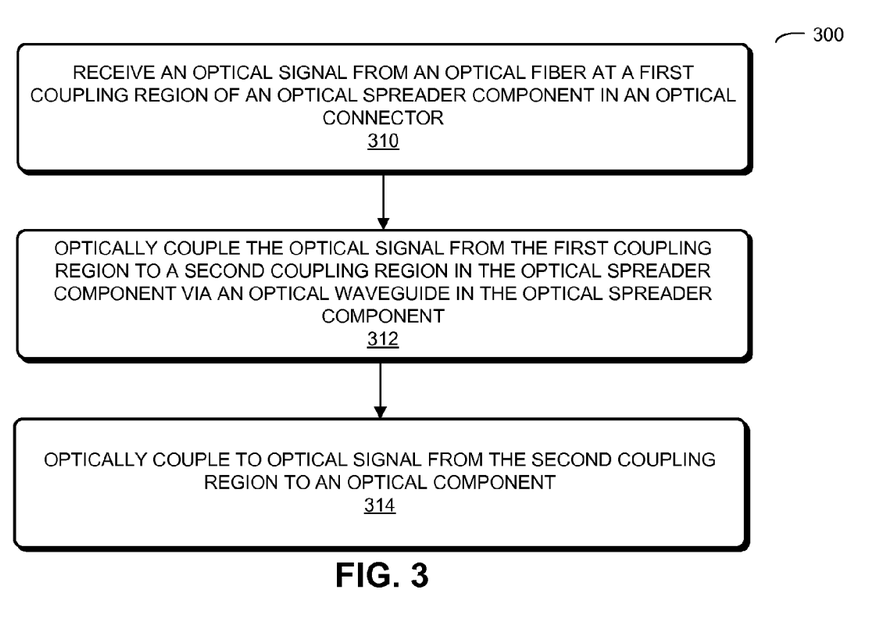
FIG. 3 is a flow chart illustrating a process for spatially segregating optical coupling between the optical fiber and the optical component using the optical connector of FIG. 1A in accordance with an embodiment of the present disclosure.

We now describe embodiments of a process for spatially segregating optical coupling between optical fibers 112 and optical component 114-1 using optical connector 110-1. FIG. 3 presents a flow chart illustrating a process 300 for spatially segregating optical coupling between optical fiber 112 (FIG. 1A) and at least one of optical components 118 (FIG. 1A) using optical connector 110-1 (FIG. 1A). During this method, a first coupling region in an optical spreader component in an optical connector receives an optical signal from an optical fiber (operation 310). Then, the first coupling region optically couples the optical signal to a second coupling region in the optical spreader component via an optical waveguide in the optical spreader component (operation 312). Next, the second coupling region optically couples the optical signal to an optical component (operation 314).

In some embodiments of process 300, there may be additional or fewer operations. Moreover, the order of the operations may be changed and/or two or more operations may be combined into a single operation.

In an exemplary embodiment, optical connector 110-1 (FIG. 1A) includes silicon-photonic channels, fiber-to-silicon couplers, and silicon-to-silicon couplers. These silicon-to-silicon couplers may have a relaxed mechanical alignment tolerance relative to fiber-to-silicon and/or fiber-to-fiber couplers. Consequently, silicon-to-silicon couplers may be used at the locations with the greatest need for a relaxed mechanical tolerance, such as field-matable connections of optical channels via a multi-fiber optical connector that has multiple rows and/or multiple columns.

Note that the improved cost, performance and reliability facilitated by optical connectors 110 (FIGS. 1A-2B) may be useful in optical systems that include wavelength-division multiplexing (WDM), in which a number of optical signals are multiplexed onto a given optical fiber. For example, optical connector 110-1 (FIG. 1A) may allow the aggregate number of channels in these optical systems to be increased (e.g., more carrier wavelengths or more optical fibers 112 in FIG. 1A).

Figure 4:
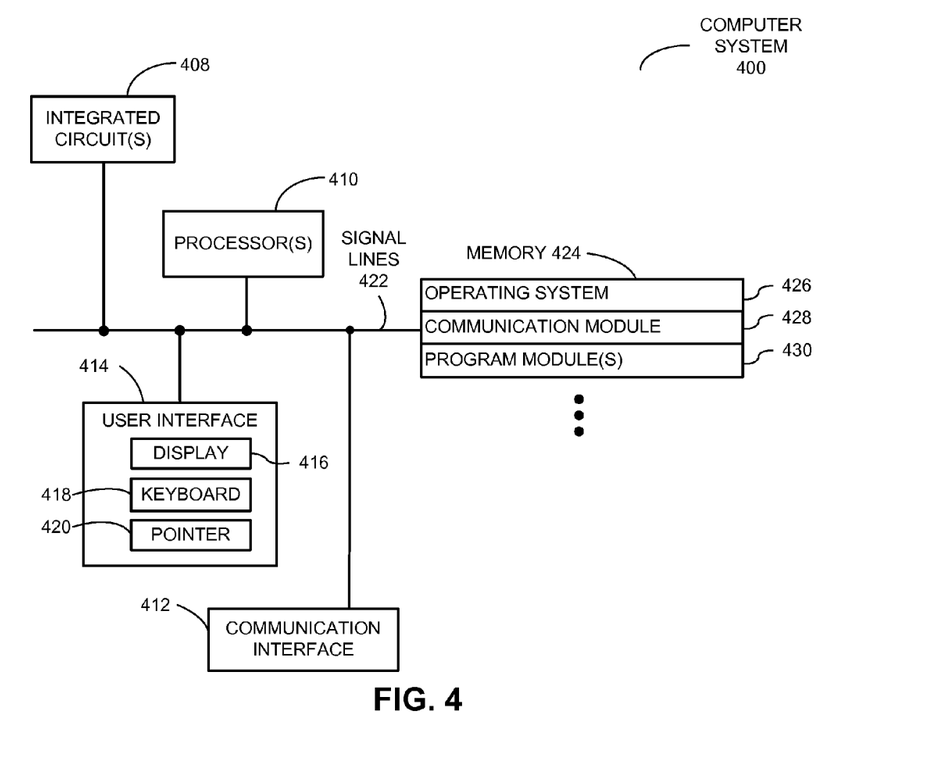
FIG. 4 is a block diagram illustrating a computer system that includes the optical connector of FIG. 1A in accordance with an embodiment of the present disclosure.

We now describe embodiments of a system, such as a computer system. FIG. 4 presents a block diagram illustrating a computer system 400 that includes one or more integrated circuits 408 with one or more instances of an optical connector, such as optical connector 110-1 (FIG. 1A). Computer system 400 includes: one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the device 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the device 400.

Memory 424 may also include one or more program modules 430 (or a set of instructions). Note that one or more of program modules 430 may constitute a computer-program mechanism. Instructions in the various modules in the memory 424 may be implemented in: a high-level procedural language, an object-oriented programming language, and/or in an assembly or machine language. The programming language may be compiled or interpreted, i.e., configurable or configured, to be executed by the one or more processors (or processor cores) 410.

Note that the one or more integrated circuits 408 (that include one or more instances of an optical connector) may be included in a multi-chip module (MCM) (such as a switch or a processor). This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Computer system 400 may include, but is not limited to: a server, a laptop computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. For example, integrated circuit(s) 408 may be included in a backplane that is coupled to multiple processor blades, or integrated circuit(s) 408 may couple different types of components (such as processors, memory, I/O devices, and/or peripheral devices). Thus, integrated circuit(s) 408 may perform the functions of: a switch, a hub, a bridge, and/or a router. Note that computer system 400 may be at one location or may be distributed over multiple, geographically dispersed locations.

Optical connectors 110 (FIGS. 1A-2B) and/or computer system 400 may include fewer components or additional components. Moreover, although these devices and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Note that some or all of the functionality of the computer system 400 may be implemented in one or more application-specific integrated circuits (ASICs) and/or one or more digital signal processors (DSPs). Furthermore, functionality in optical connectors 110 (FIGS. 1A-2B) and/or computer system 400 may be implemented more in hardware and less in software, or less in hardware and more in software, as is known in the art.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. An optical connector, comprising:
   an optical fiber; and
   an optical spreader component, disposed on a substrate, configured to spatially segregate optical coupling between the optical fiber and an optical component, wherein the optical spreader component includes:
   a first coupling region that is optically coupled to the optical fiber;
   an optical waveguide that is optically coupled to the first coupling region; and
   a second coupling region that is optically coupled to the optical waveguide, and which is configured to optically couple to the optical component, wherein a location of the second coupling region is different than a location of the first coupling region;
   a second optical connector including an optical spreader component disposed on a second substrate that is separate from the substrate, wherein the second coupling region is optically coupled to a third coupling region on the second optical connector.

2. The optical connector of claim 1, wherein the optical component includes an optical source.

3. The optical connector of claim 1, wherein a mechanical alignment tolerance of optical coupling between the optical connector and the optical component is larger than a carrier wavelength of an optical signal conveyed via the optical fiber.

4. The optical connector of claim 1, wherein the optical component includes an optical detector.

5. The optical connector of claim 1, wherein the optical component includes another instance of the optical connector, which includes another optical spreader component which is disposed on another substrate.

6. The optical connector of claim 5, wherein the second coupling region is optically coupled to a third coupling region in the other instance of the optical connector via optical proximity communication.

7. The optical connector of claim 5, wherein the second coupling region is optically coupled to a third coupling region in the other instance of the optical connector via a spherical optical ball.

8. The optical connector of claim 1, wherein mechanical coupling between the optical fiber and the optical spreader component is rigid.

9. The optical connector of claim 1, wherein the optical spreader component is configured to re-matably mechanically couple to the optical component.

10. The optical connector of claim 1, wherein the first coupling region includes an optical coupling component that optically couples an optical signal from the optical fiber to the optical waveguide.

11. The optical connector of claim 10, wherein the optical coupling component includes a diffraction grating.

12. The optical connector of claim 1, wherein the optical spreader component is a passive device.

13. The optical connector of claim 1, wherein the optical spreader component includes routing from a first group of coupling regions, which includes the first coupling region, to second group of coupling regions, which includes the second coupling region.

14. The optical connector of claim 1, wherein the optical spreader component includes one of: a wavelength-selective multiplexer and a wavelength-selective de-multiplexer.

15. The optical connector of claim 1, wherein the optical spreader component includes optical switching of optical signals.

16. The optical connector of claim 1, wherein the optical spreader component includes active optical amplitude equalization.

17. The optical connector of claim 1, wherein the optical spreader component includes optical gain.

18. A system, comprising:
an optical connector, wherein the optical connector includes:
an optical fiber; and
an optical spreader component, disposed on a substrate, configured to spatially segregate optical coupling between the optical fiber and an optical component, wherein the optical spreader component includes:
a first coupling region that is optically coupled to the optical fiber;
an optical waveguide that is optically coupled to the first coupling region; and
a second coupling region that is optically coupled to the optical waveguide, and which is configured to optically couple to the optical component, wherein a location of the second coupling region is different than a location of the first coupling region; and
a second optical connector including an optical spreader component disposed on a second substrate that is separate from the substrate, wherein the second coupling region is optically coupled to a third coupling region on the second optical connector.

19. A method for spatially segregating optical coupling between an optical fiber and an optical component using an optical connector, comprising:
receiving an optical signal from the optical fiber at a first coupling region in an optical spreader component in the optical connector, wherein the optical spreader component is disposed on a substrate;
optically coupling the optical signal from the first coupling region to a second coupling region in the optical spreader component via an optical waveguide in the optical spreader component;
optically coupling the optical signal from the second coupling region to the optical component; and
optically coupling a third coupling region of a second optical connector to the second coupling region, wherein the second optical connector includes an optical spreader component disposed on a second substrate that is separate from the substrate.

20. The optical connector of claim 1, wherein a plane through the first coupling region that is parallel to the first coupling region is above or below a plane through the second coupling region that is parallel to the second coupling region.

* * * * *